(12) United States Patent
Huang et al.

(10) Patent No.: US 10,102,372 B2
(45) Date of Patent: *Oct. 16, 2018

(54) BEHAVIOR PROFILING FOR MALWARE DETECTION

(71) Applicant: Proofpoint, Inc., Sunnyvale, CA (US)

(72) Inventors: Wayne Huang, New Taipei (TW); M. James Idle, Taipei (TW)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,018

(22) Filed: Jun. 14, 2017

(65) Prior Publication Data

US 2017/0286678 A1 Oct. 5, 2017

Related U.S. Application Data

(63) Continuation of application No. 14/659,272, filed on Mar. 16, 2015, now Pat. No. 9,734,332.

(Continued)

(51) Int. Cl.
*G06F 21/00* (2013.01)
*G06F 21/56* (2013.01)
*H04L 29/06* (2006.01)

(52) U.S. Cl.
CPC .......... *G06F 21/562* (2013.01); *G06F 21/567* (2013.01); *H04L 63/1433* (2013.01); *G06F 2221/034* (2013.01); *H04L 63/145* (2013.01)

(58) Field of Classification Search
CPC ............... G06F 21/562; G06F 21/567; G06F 2221/034; H04L 63/1433; H04L 63/145
See application file for complete search history.

(56) References Cited

U.S. PATENT DOCUMENTS

| | | |
|---|---|---|
| 6,484,143 B1 | 11/2002 | Swildens et al. |
| 7,779,399 B2 | 8/2010 | Huang et al. |

(Continued)

FOREIGN PATENT DOCUMENTS

| | | |
|---|---|---|
| EP | 3120286 A1 | 1/2017 |
| WO | WO2015142755 A1 | 9/2015 |

OTHER PUBLICATIONS

Non-Final Office Action, dated Jul. 12, 2016, U.S. Appl. No. 14/659,272, filed Mar. 16, 2015.

(Continued)

*Primary Examiner* — Don G Zhao
(74) *Attorney, Agent, or Firm* — Carr & Ferrell LLP

(57) ABSTRACT

Provided herein are systems and methods for behavior profiling of targets to determine malware presence. The method includes, in various embodiments, applying a domain specific language to a target; observing a set of temporal sequences and events of the target; determining the presence of markers within the set of temporal sequences and events indicative of malware; and identifying the target as being associated with malware based on the markers. In some embodiments, a malware detection system is provided for creating a behavioral sandbox environment where a target is inspected for malware. The behavioral sandbox environment can include forensic collectors. Each of the collectors may be configured to apply a domain specific language to a target; observe a set of temporal sequences and events of the target; determine the presence of markers within the set of temporal sequences and events indicative of malware; and detect malware presence based on the markers.

20 Claims, 7 Drawing Sheets

Related U.S. Application Data

(60) Provisional application No. 61/954,373, filed on Mar. 17, 2014.

(56) References Cited

U.S. PATENT DOCUMENTS

| | | | |
|---|---|---|---|
| 7,779,472 B1* | 8/2010 | Lou | G06F 21/566 |
| | | | 726/22 |
| 8,555,269 B2 | 10/2013 | Huang et al. | |
| 8,711,838 B1* | 4/2014 | Guichard | H04L 12/4633 |
| | | | 370/351 |
| 8,887,286 B2* | 11/2014 | Dupont | G06F 21/00 |
| | | | 726/25 |
| 9,213,837 B2* | 12/2015 | Richard | G06F 21/562 |
| 9,215,074 B2* | 12/2015 | Wyatt | G06F 8/70 |
| 9,411,955 B2* | 8/2016 | Jakobsson | G06F 21/55 |
| 9,734,332 B2 | 8/2017 | Huang et al. | |
| 2009/0077664 A1 | 3/2009 | Hsu et al. | |
| 2009/0144827 A1* | 6/2009 | Peinado | G06F 21/577 |
| | | | 726/25 |
| 2011/0061104 A1* | 3/2011 | Sarraute Yamada | |
| | | | H04L 41/0823 |
| | | | 726/23 |
| 2011/0078141 A1* | 3/2011 | Fakeih | G06F 17/30536 |
| | | | 707/736 |
| 2011/0154494 A1 | 6/2011 | Sundaram et al. | |
| 2011/0283360 A1 | 11/2011 | Abadi et al. | |
| 2012/0137367 A1* | 5/2012 | Dupont | G06F 21/00 |
| | | | 726/25 |
| 2012/0220486 A1* | 8/2012 | Farinas | C12Q 1/6825 |
| | | | 506/9 |
| 2013/0086681 A1 | 4/2013 | Jaroch | |
| 2013/0103715 A1* | 4/2013 | Beckman | G06F 9/547 |
| | | | 707/770 |
| 2013/0117849 A1 | 5/2013 | Golshan et al. | |
| 2013/0326625 A1* | 12/2013 | Anderson | G06F 21/56 |
| | | | 726/23 |
| 2013/0332988 A1* | 12/2013 | Thomas | G06F 21/562 |
| | | | 726/1 |
| 2014/0047544 A1* | 2/2014 | Jakobsson | G06F 21/55 |
| | | | 726/23 |
| 2015/0007312 A1* | 1/2015 | Pidathala | H04L 63/145 |
| | | | 726/22 |
| 2015/0067399 A1* | 3/2015 | Jaroker | G06F 11/2294 |
| | | | 714/37 |
| 2015/0096025 A1 | 4/2015 | Ismael | |
| 2015/0261955 A1* | 9/2015 | Huang | G06F 21/562 |
| | | | 726/23 |
| 2015/0310196 A1* | 10/2015 | Turgeman | G06F 21/552 |
| | | | 726/19 |
| 2016/0098561 A1* | 4/2016 | Keller | G06F 21/554 |
| | | | 726/24 |
| 2016/0156652 A1* | 6/2016 | Paffenroth | H04L 63/1425 |
| | | | 726/23 |

OTHER PUBLICATIONS

Final Office Action, dated Jan. 9, 2017, U.S. Appl. No. 14/659,272, filed Mar. 16, 2015.

Notice of Allowance, dated Mar. 28, 2017, U.S. Appl. No. 14/659,272, filed Mar. 16, 2015.

International Search Report and Written Opinion dated Jun. 25, 2015 in Patent Cooperation Treaty Application No. PCT/US2015/020807, filed Mar. 16, 2015, 14 pages.

* cited by examiner

BEHAVIOR PROFILING FOR MALWARE DETECTION

CROSS REFERENCE TO RELATED APPLICATIONS

This application is a Continuation of U.S. patent application Ser. No. 14/659,272 filed Mar. 16, 2015 (now U.S. Pat. No. 9,734,332, issued Aug. 15, 2017), which claims the benefit of U.S. Provisional Application Ser. No. 61/954,373, filed Mar. 17, 2014, which are hereby incorporated by reference herein in their entirety, including all references cited therein.

FIELD

The present technology pertains to data security, and more specifically, but not by limitation, to systems and methods that employ behavior profiling for malware detection. In some embodiments, the systems and methods use domain specific languages in order to profile the behavior of a domain such as a document, executable file, a Uniform Resource Locator (URL), or other target. The behaviors are comprised of at least temporal sequences of events that, when analyzed, will yield evidence that can be analyzed to detect the presence of malware.

SUMMARY

According to various embodiments, the present technology is directed to a method comprising: (a) applying a domain specific language to a target, the domain specific language utilized to detect malware associated with the target; (b) observing a set of temporal sequences and events of the target; (c) determining presence of one or more markers within the set of temporal sequences and events that are indicative of malware; and (d) identifying the target as being associated with malware based on the one or more markers.

According to some embodiments, the present technology is directed to a system comprising: (a) a processor; and (b) a memory for storing executable instructions, the instructions being execute by the processor to create a behavioral sandbox environment where a target is inspected for malware, the behavioral sandbox environment comprises (c) a plurality of forensic collectors that are each configured to (i) apply a domain specific language to a target; (ii) observe a set of temporal sequences and events of the target; (iii) determine presence of one or more markers within the set of temporal sequences and events that are indicative of malware; and (iv) detect malware presence based on the one or more markers.

The present technology, according to some embodiments, is directed to a non-transitory computer-readable medium having embodied thereon instructions being executable by at least one processor to perform a method for providing malware detection, the method comprising: (a) retrieving a URL, the retrieving comprising contacting a server to receive a home page code; (b) performing a preliminary determination to determine if the home page code includes a malicious signature; (c) in response to the home page code being deemed clean such that the preliminary determination is that no malicious signature is included on the home page code, parsing the home page code and translating the home page code onto a web page; (d) rendering text and links to external databases for images on the web page; (e) allocating memory to perform the rendering of the images; (f) generating an event log of all items rendered on the web page; (g) analyzing a chronological order of events in the event log to identify behavior patterns among the events; (h) comparing identified behavior patterns to predetermined rules; and (i) identifying the URL as including malware if a match is found between the identified behavior patterns and the predetermined rules.

The present technology, according to some embodiments, is also directed to a method comprising: (a) applying a domain specific language to a target, the domain specific language utilized to detect malware associated with the target; (b) observing a set of temporal sequences and events of the target; (c) determining presence of one or more markers within the set of temporal sequences and events that are indicative of malware; and (d) identifying the target as being associated with malware based on the one or more markers.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented by appropriate conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
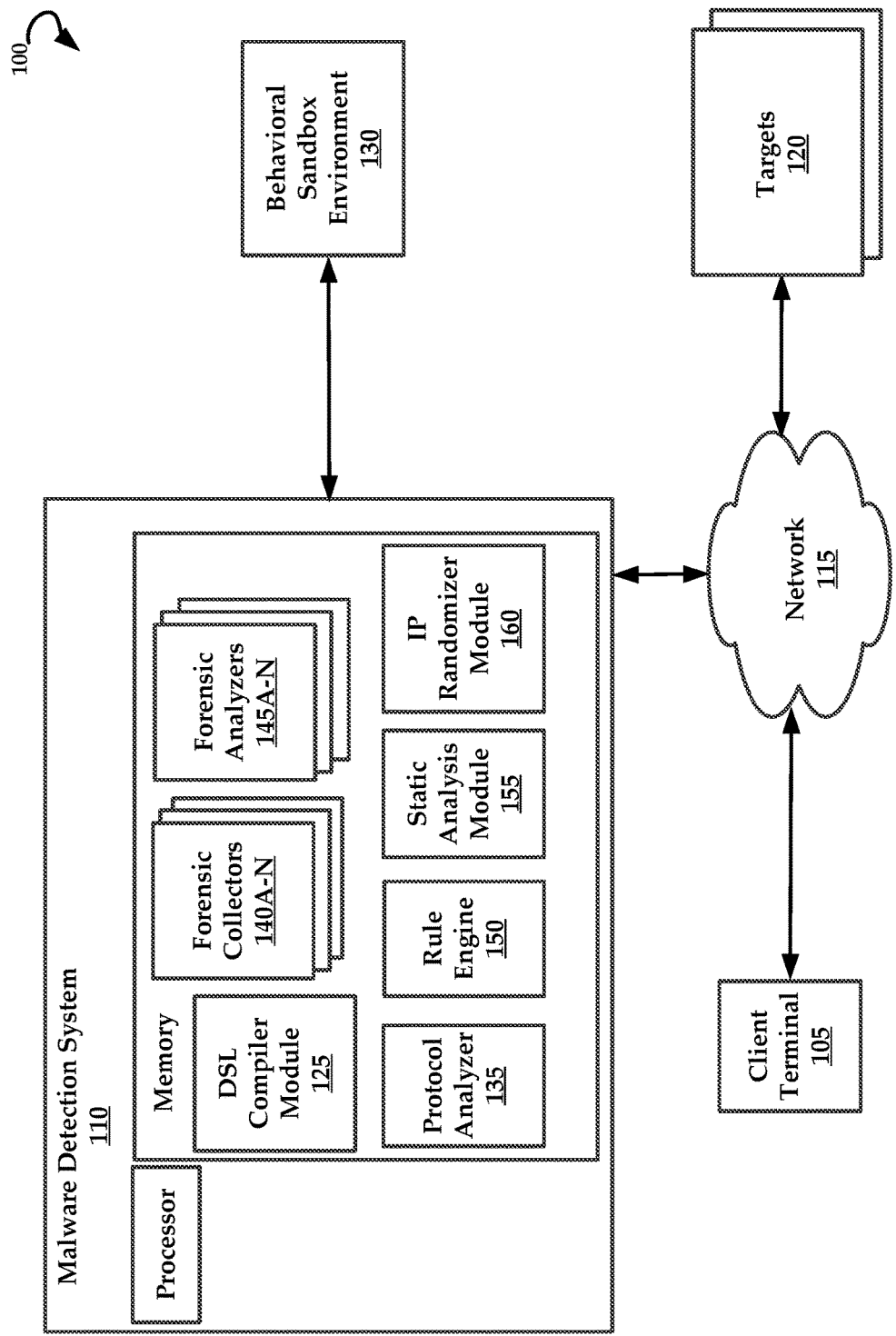
FIG. 1 is a schematic diagram of an example computing environment for practicing aspects of the present technology.

As more and more services and transactions are provided via the World Wide Web, users are more likely to click on a link or a document that contains malware. Email is a primary attack vector in Advanced Persistent Threats (APT), and is often used to deliver malicious URLs and documents to victims.

Current technologies, such as anti-virus software programs and network firewalls, started out aiming at detecting viruses on the personal computer (PC). However, as the PC has always had very limited computation power, the antivirus software's goal has been to "detect as much as possible" under constrained resources.

This concept rooted even deeper into the antivirus industry as the Internet boomed and antivirus vendors started to integrate with network devices—firewalls, gateways, email servers, and so forth. Since speed is critical and computation power is limited on an appliance, antivirus technology went further down the road of signature-based pattern matching.

However, signature-based pattern matching does not always detect the malware before it infects a computer. For malware detection that relies solely on signature-based pattern matching, it is possible that a threat is not perceived, because the signature appears to be legitimate.

Some malware uses an exploit-based malware infection (EBMI) process, which is a widely used attack vector in Advanced Persistent Threats. In EBMI, the victim is infected by opening a malicious document, often referred to as a document exploit. Common document exploit formats used in EBMI include web pages, PDF files, Word™ files, Powerpoint™ files, Excel™ files, and Flash™ files embedded inside one of the previous types.

During EBMI phase one, a victim opens a document via a document renderer, defined as a software program that displays the document. Common (document, renderer) pairs include (web page, web browser), (web page containing flash, web browser with flash support or plug-in), (web page containing Java™ applets, web browser with applet support/JRE), (PDF document, PDF reader), (Word document, MS Word™), (Excel document, MS Excel™), (Powerpoint™ document, MS Powerpoint™), and so forth.

The document in this instance, being malicious, is referred to as a document exploit. It contains mechanisms to exploit vulnerabilities either directly inside the renderer itself, or inside one of the renderer's installed plug-ins (e.g., Flash™, Java™ applet, Real Player™, and so forth.). If the exploited vulnerability is unknown to the renderer provider (vendor), then it is called a zero-day exploit.

The exploitation code (exploit) may be implemented using scripting languages (e.g., Javascript™, Actionscript™, VBScript™, VBA™). Scripting languages provide the functionality needed to exploit the targeted vulnerability. Since scripting languages are interpreted languages, it is very easy to obfuscate the exploitation code, thus making detection difficult. Common (renderer, scripting language) pairs include (web browsers, Javascript™), (Flash™, Actionscript™), (PDF, JScript™), (Office documents, VBA macros). Note that Javascript™, Actionscript™, and JScript™ are all ECMA-based scripting languages.

The following attacks may leverage an EBMI process: (a) drive-by download attacks, (b) malvertising attacks, (c) URL-based email attacks, and (d) attachment-based email attacks. In (a) (b) and (c), the browser may load a web page served by an exploit pack, which serves polymorphic web-page exploits. The server that hosts the exploit pack is called the exploit server, and the involved URLs are called the exploit URLs.

When a document exploit is opened, and upon successful exploitation, a dropper is often created on disk and executed. The dropper can either be the actual malware, or it can be just a tiny executable whose sole job is to download the actual malware over the Internet.

In order to attempt to permanently infect a compromised system, the malware will often (a) move itself to permanent disk locations; and (b) modify system configuration (e.g., registry settings) so as to be auto executed upon every system startup. In order to hide itself from security checkers and users, the malware will often rename itself to seemingly legitimate filenames or arrange for alternative, less detectable and higher-privileged methods of execution, for example, using process injection.

Once permanently installed, the malware will typically start to (a) connect back to the command-and-control (CNC) server, or to (b) send the collected information back to the attacker.

Accordingly, it would be desirable to provide methods and systems to detect malware before it is downloaded onto a user's computer. Furthermore, it would be desirable to receive detailed forensics reports on exactly what occurred during the two EBMI phases. These and other advantages of the present technology will be described with reference to the collective drawings (FIGS. 1-7).

FIG. 1 illustrates an example environment 100 in which aspects of the present technology can be implemented. The environment 100 comprises at least one client terminal 105, such as an end user computing system utilized by an end user to interact with a malware detection system, hereinafter ("system 110"). In some embodiments, the client terminal 105 and system 110 are communicatively coupled with one another via a network 115.

The network 115 may include private or public communication channels such as the Internet. Suitable networks may include, or interface with, any one or more of a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, a Digital Subscriber Line connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks; including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

According to some embodiments, the system 110 may include a cloud-based computing environment for threat analysis and detection system using data analytics. In general, a cloud-based computing environment is a resource that typically combines the computational power of a large grouping of processors and/or combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers such as web servers with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

The system 110 may be generally described as a particular purpose computing environment that includes executable instructions that are configured to provide target behavioral profiling to determine the presence of malware based on temporal activities and events of a target.

In general, the system 110 can be used to create and apply threat description languages to targets, such as targets 120. The targets 120 comprise, for example, web servers that provide a URL, an entry URL, a document, an executable file, or any other targeted mentioned herein. Also, a target can be referred to as a suspect when the target is being analyzed by the system 110.

A threat description language is referred to herein as a domain specific language (DSL). In some embodiments, the system 110 is configured to apply a formal threat description language to a target. In one example, a DSL can be used to describe and detect malware in HTTP protocol streams, which facilitates malware detection. The DSL may be used to describe behavior and patterns exhibited within conversations between HTTP clients including, but not limited to, web browsers and HTTP servers. Example HTTP servers (e.g., targets) can include Internet web servers. The DSL may be implemented as a cloud-based software-as-a-service (SaaS) or as part of a hardware appliance in communication with a network server. Source code inputs to this system 110 may have a unique file format and can comprise source code for the DSL.

In some embodiments, a DSL may be a declarative language that is defined when a user specifies tests that should be performed while analyzing an HTTP conversation, but does not specify how those tests are run, in what order, or any other kind of logic flow.

Additionally, a DSL compiler may use source code files that include rule sets to generate Java™ source code, which may contain logic flow and procedure generated by internal 'knowledge' encapsulated within the compiler.

Thus, in some embodiments, the system 110 comprises a DSL compiler module 125 to generate a set of rule files and compile the same into a collection of Java files, which in turn may be compiled into a rule engine 150.

In other embodiments, the rules can be created using other means such as user creation or another computerized automatic code generator.

The rule engine 150 may be supported by an external runtime library, which may also be written in Java™ in various embodiments. Java™ may be advantageous due to its portability among operating systems and hardware, however, the DSL compiler module 125 could generate any other procedural based language as output, including machine code directly, assembly language, C and so forth.

The generated rule set is intended to be incorporated in one or more other systems such as a protocol analyzer 135, which assembles network data packets into their original conversations between client terminal 105 and the target 120, or a behavioral sandbox environment 130, which uses a rule set to check HTTP conversations, URLs found to be visited by a program, and other activities or actions.

Temporality is one of the advantages of various embodiments for describing and detecting malware. More specifically, the rules of the DSL may be based on observed temporal sequences and events between a client terminal 105 and a target 120. For example, if a browser visits a web page before being sent to another (second) web page, and then a Javascript is found in the second page, the Javascript may be identified as malware by the system 110.

Rules may be programmed to identify malware based on any of: (a) URLs visited, pages containing certain content; (b) the presence or absence of certain HTTP headers or their values; (c) the presence of certain Javascripts (or classes of Javascripts); and (d) the detection of an attempt to download certain binaries with a known signature and other markers—just to name a few.

In one embodiment, a rule of the DSL may detect one or more of these markers and make decisions about the presence of malware based on the combinations of markers that are present (or not).

In some embodiments, a rule of a DSL can also detect entities that are somewhat like known malware, such as for Javascripts and binary downloads, and so forth. There can be, for instance, a certain confidence level that something detected is a variant of another known example malware. For example, in an attempt to disguise some new variant of a threat programmed in Javascript, malware authors may change the names of variables and non-useful code, and generally try to obfuscate the code. The system 110, using a DSL, can detect various such changes and match the original threat vector with a given probability (calculated from how different the new version of the threat is from the original.)

After a set of rules is generated, an HTTP conversation (or other activity) may be assessed using a rule set of a DSL. In this example, the system 110 examines the conversations under all rules (or a portion thereof) that the rule set contains. Detected issues may be evinced to a collector program. In some embodiments, a DSL may not itself define how these HTTP conversations are captured by the collector program. Accordingly, a DSL may advantageously be modular, and can be integrated with anything that can present the DSL with a seemingly valid HTTP conversation.

Although examples have been outlined above regarding the use of DSLs for inspecting HTTP conversations, such examples are not to be construed as limiting. A DSL may be used by the system 110 to inspect a binary or text file, with some parts of the language being designed to have more relevance than others to the type of document/file set it is presented with. Moreover, a DSL may be a working language/system, which is constantly being enhanced as different threat vectors are discovered by researchers.

For example, the DSL can be a module or engine deployed on a network or onto a specific server or target. As used herein, the terms "module" or "engine" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In general, a DSL may provide, relative to a target and its activities, a clear definition of what to look for, as well as a coherent methodology that can be used by the system 110 to present the analyzed information so as to facilitate clear understanding and further use of the information. To realize these two factors, in various embodiments, the system 110 utilizes a DSL in a forensics reporting methodology (FRM).

Users of the system 110 (in some embodiments, an application programming interface (API) for the DSL) can submit the following types of targets for analysis such as URLs, a starting URL (e.g., entry point) of an entire website to be crawled and scanned for malware; advertisement tags; document files; and executable files—just to name a few.

The output of system 110 may be zero day, advanced persistent threat malware forensics, FRM-based reports, and combinations thereof. In the FRM, a target that is scanned by the system 110 is referred to as a suspect.

In some embodiments, the system 110 is configured to provide a forensic analysis by comparing a behavior analysis of a target and identification of the malware. At the end of its automated scanning process, the system 110 (using a DSL) may determine the suspect's maliciousness, identification, and behaviors of the malware.

Determining whether a suspect (e.g., target that is suspected of having malware) is malicious or benign may be a primary objective of the system 110. However, determining the identity of the attacker can be difficult when the suspect is new or has been rarely seen. The system 110 may be used to identify zero-day exploits and advanced persistent threat (APT) malware. To be sure, with these types of suspects, determining the identification of the malware or its authors may be difficult because these types of malware do not yet have names.

What is very valuable to victims of malware, however, is having behavioral knowledge of a suspect. The behavioral knowledge allows administrators to answer questions such as: "what does it do to the victim?"; "what does it steal?"; "what does it break?"; "what does it install?"; "where is it trying to connect back to?"; "what protocols are used?"; and so forth. The exact types of questions that can be answered by the system 110 depend on the malware itself, such as whether the malware is an executable file or a URL phishing attack, as well as the behaviors of the malware.

Such knowledge can aid the victim in their incidence response efforts, as well as help them understand more about an identity of the attacker. An FRM may be designed by the system 110, with its forensics reporting focusing much more on maliciousness and behavior.

In some embodiments, the system 110 may detect malware and collect forensic information by letting a suspect execute inside a monitored sandbox, such as the behavioral sandbox environment 130. Modern malware, and especially the types used in APT, often incorporates many painstakingly-developed features that differentiate a benign victim environment (BVE) against a monitored lab environment (MLE) used to analyze malware behavior, such as a malware sandbox.

Malware may incorporate both active and passive MLE-detection features. Malware can actively detect victim environment behavior such as NIC names, special CPU instructions, registry entries, so forth, that are indicative of MLEs. When malware detects that it is executing inside a sandbox, it may terminate and in some cases also delete itself. This prevents forensics information from being collected.

Passive detection techniques include for example waiting for a period of time before actually performing malicious activities. MLEs typically do not wait forever, and therefore, after letting the suspect execute for a fixed period of time and not observing any malicious behavior, an MLE can declare a malicious suspect as benign.

Due to the above-mentioned techniques, the behavioral sandbox environment 130 may first attempt to induce or provoke an attack, in order to study a malware suspect and observe its behavior. When this is successful and the suspect starts to perform malicious activities, a "scene" has been generated from a suspect.

Figure 2:
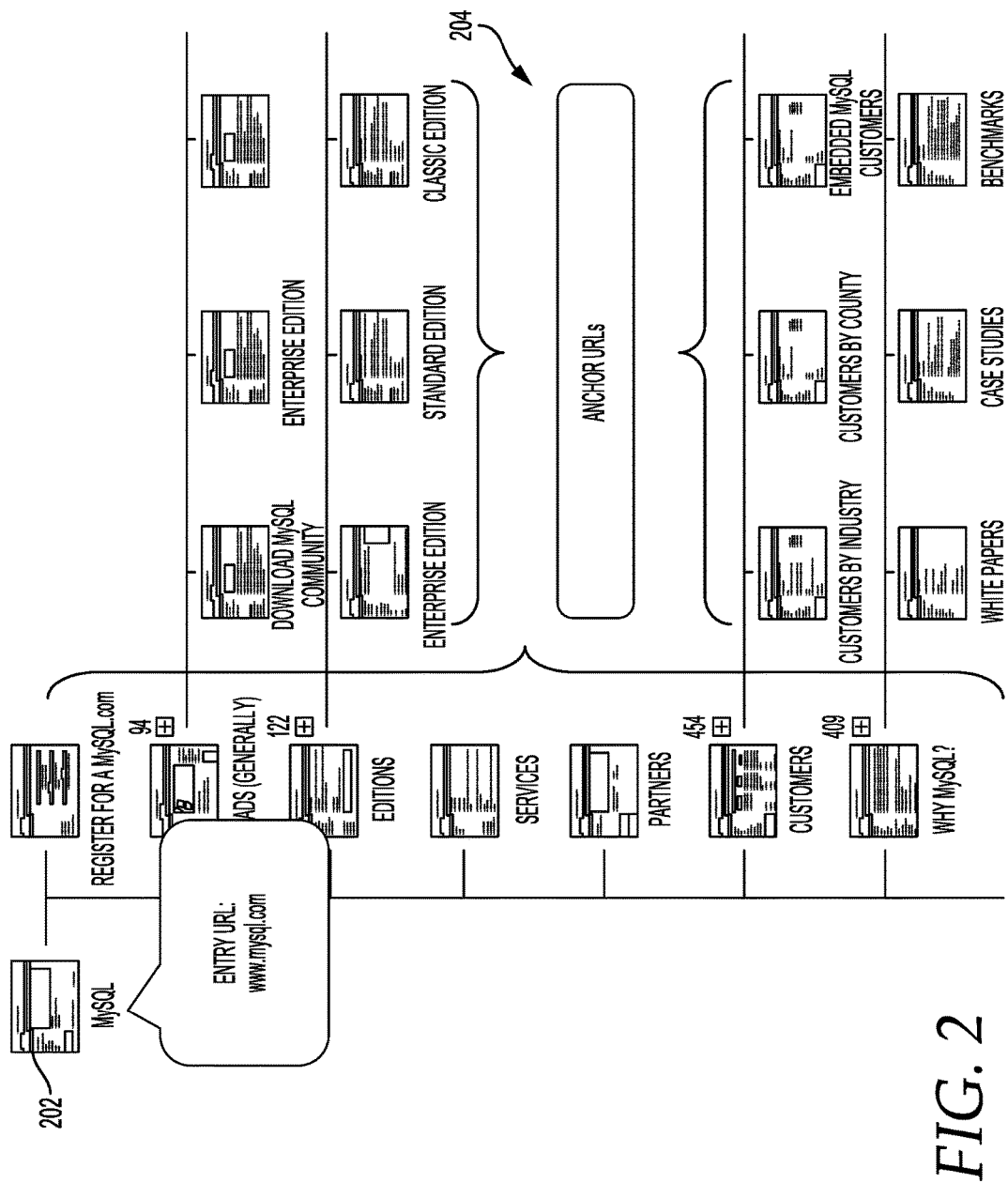
FIG. 2 illustrates an example malware analysis of an entry URL and anchor URLs associated with www.mysql.com.

In summary, opening, rendering and execution of a document or other suspect within the behavioral sandbox environment 130 may create a scene, which sets the scope of a forensics investigation effort. A scene can comprise sub-scenes. In one example, when scanning an entire website, opening the entry URL using a browser creates the root scene, and subsequently opening up the rest of the website's pages creates sub-scenes under the root scene. An example entry URL analysis process is illustrated in FIG. 2.

Each scene or sub-scene is comprised of evidence, which includes the activities and events occurring with respect to a target (e.g., suspect). The behavioral sandbox environment 130 may utilize multiple forensics collectors 140A-N. For each scene, the collectors may jointly gather as much evidence as possible. Evidence may be defined as activities or events that occurred within a scene. By way of example, evidence can comprise HTTP requests and responses, exploitation efforts (e.g., heap spraying), file creation and modification, process creation, registry changes, foreign memory manipulation, as well as other behaviors of malware that can be quantified or observed. An aspect of the evidence may be the raw data that is collected, for example the raw HTTP response content. Each scene may have multiple instances of evidence. The behavioral sandbox environment 130 can be configured to apply to each instance of evidence a time stamp. Thus, instances of evidence can be sorted in chronological order by the system 110.

Multiple forensics analyzers 145A-N may be run against each evidence instance's raw data in some embodiments. These forensics analyzers 145A-N generate multiple forensics reports for each instance of evidence, each forensics report may include four elements proofs, exhibits, interpretations, and correlations.

Proofs may be a predefined set of facts. In various embodiments, the forensic analyzer is designed to prove the existence of the predefined set of facts within a scene. Examples of proofs may include the following: (a) "suspicious-or-malicious-scripts"; (b) "injected-scripts"; (c) "blacklisted-url"; (d) "exploit-pack"; (e) "tds"; (f) "exploit"; (g) "dropper"; (h) "execute"; (i) "registry-modifications"; (j) "file-modifications"; (k) "network-activities"; (l) "dns-lookups"; (m) "http-requests"; (n) "foreign-memory-read"; (o) "remote-threads-created"; (p) "mutexes-created"; (q) "process-inject"—just to name a few examples. In one embodiment, proofs are derived based on exhibits.

An exhibit may be a section of an instance of evidence that has special meaning and can be used to derive a certain proof. Examples of exhibits may include: a snippet of malicious code (exhibit) inside an HTTP response (evidence), a certain path (exhibit) in which a browser is trying to create a file (evidence), or a certain registry key (exhibit) that a PDF reader is trying to modify (evidence).

Exhibits are useful because an exhibit explains a reason why a forensics analyzer is deriving a certain proof based on particular evidence. Sometimes, exhibits are also extremely useful during incidence response; for example, knowing the exact malicious snippet that was maliciously injected into a website can be used, in various embodiments, to help the website owner quickly mitigate the infection. Because the system 110 may collect fine-grained evidence instances, exhibits may often include each activity for an instance of evidence.

In some embodiments, a forensics report may have at least one interpretation. An interpretation may be a judgment that a forensics analyzer is making against a scene, based on a set of derived proofs. Examples of interpretations may include one or more of the following: "malicious;" "suspicious;" and "blacklisted." In one example, a forensic analyzer can determine, based on evidence that a target URL has malware associated with it based on its activities in the behavioral sandbox environment 130. The forensic analyzer can blacklist the URL based on this knowledge.

Figure 5:
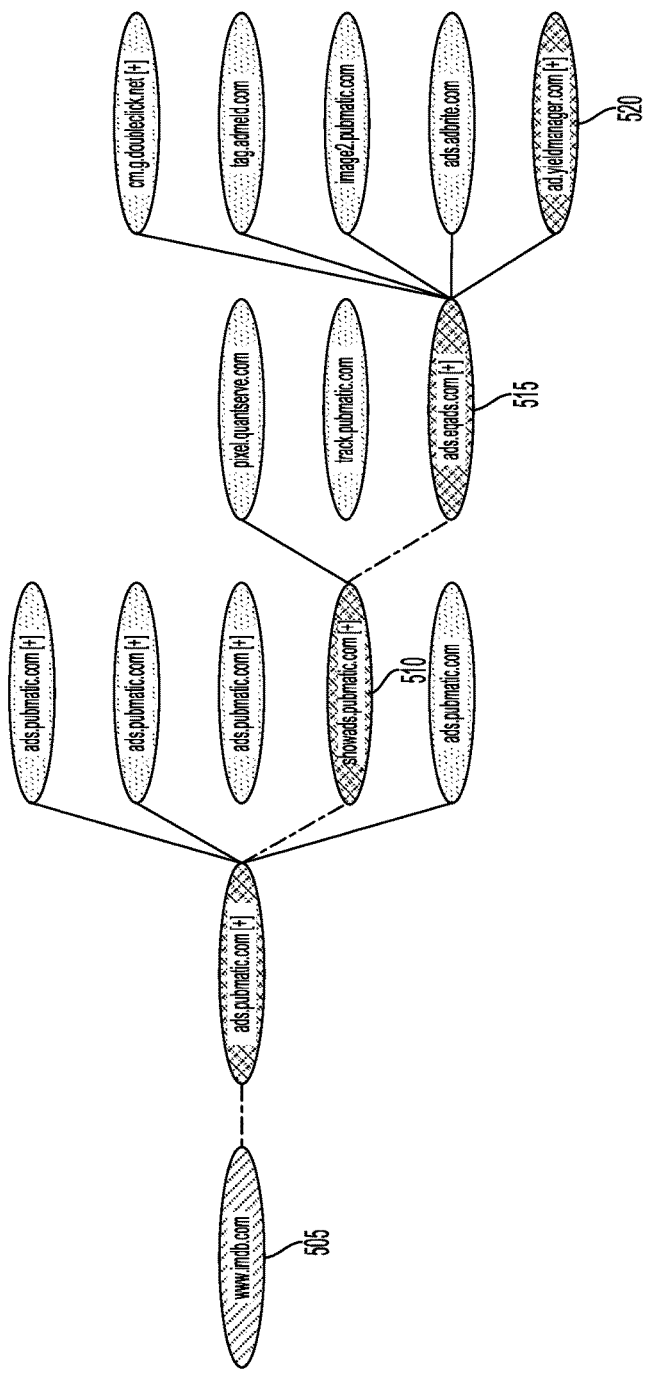
FIG. 5 is an example web UI comprising a graph illustrating temporal events in an advertisement delivery process caused by a user clicking an advertisement tag.

In some embodiments, correlations may be used within a forensics report to express causal relationships between evidences. Each evidence can have a single causal evidence, but may have multiple resulting evidences. Therefore, the causal relationships of an entire scene can be visualized using a tree representation in some embodiments. An example tree graphical representation is illustrated in FIG. 5, which is described in greater detail below.

In some embodiments, an instance of evidence is analyzed by a plurality of forensics analyzers 145A-N, each generating one or more forensics reports. Thus, an instance of evidence may be associated with an aggregated set of exhibits, proofs, interpretations, and correlations.

Similarly, each scene can be correlated to multiple evidences. Thus, a scene will have an aggregated set of proofs and interpretations in various embodiments. For those targets that require analysis of multiple sub-scenes (e.g., scanning an entire website), sub-scene reports can be aggregated to form the root scene's aggregated report. Aggregated interpretations of a target's root scene may be used to derive a set of the target's interpretations.

As mentioned above, the present technology can be implemented with the use of an API. The API used by the system 110 may be accessed by making calls to a scanning service via HTTPS. The scanning service can include a virtualized embodiment of the system 110 executing within a cloud-based environment.

The API may implement security and authentication via a combination of secure HTTP (HTTPS), HTTP basic authentication, and {id, password} pairs embedded in request JavaScript Object Notations (jsons). That is, the scanning service can be implemented in a service that is separated from the system 110 to prevent system infection.

With respect to HTTPS, the scanning service may only be accessible via HTTPS in some embodiments. With respect to basic authentication, it may be required for every single HTTPS request, which implies every HTTPS request must be sent with a base64-encoded authentication string in some embodiments. With respect to the {id, password} pair inside request jsons, it will be understood that some API calls require this additional {id, password} pair.

Because of basic authentication and id and password pair, each user may be provided with two different {id, password} pairs, one for basic authentication and the other for the id and password pair. Examples herein will denote the pair used for basic authentication as Account ("Basic") and the pair used for an id and password pair as Account (malware detection API).

The malware detection API may support the following targets (suspects) for analysis: URLs; an entry point URL of an entire website to be crawled and scanned for malware; advertisement tags; document files; and executables. As noted above, a target may be referred to as a suspect when the target is being analyzed by the system 110.

The scanning service may implement from scratch its own malware analysis sandbox. The scanning service may run multiple renderers (e.g., browsers, PDF readers, MS Office Word, Excel, PowerPoint) on top of its virtualization platform, such as a virtual machine executing within a cloud. The scanning service may then collect forensic information and then execute multiple analyzers against the collected data. At the end of this process, an aggregated FRM (Forensics Reporting Methodology) report may be returned to the API caller, such as the client terminal 105.

Within the aggregated FRM (AFRM) report, the interpretation state judgment of the subject (the target) may be based on proofs of malicious activities. These proofs may be derived from exhibits, which comprise those portions of the evidence instances collected during forensics extraction (see above).

Evidence contained in the AFRM report may be fully correlated, and therefore can be used to generate a precise incident traceback. The generated precise incident traceback may describe in detail the entire dependency chain of an exploit-based malware infection (EBMI) incident, from the point of malware introduction, to each involved resources, to the actual point of exploitation, to the location of the ultimately installed malware binary, to the installation and execution of that malicious binary, to the harvesting of user data, to the controlling of user environment, to the connection back to the command and control.

Certain components of an EBMI process may be downloaded over the Internet. To avoid detection, exploit kits and malicious traffic distribution systems (TDS) may implement an Internet Protocol address (IP address) cloaking scheme (also referred to herein as IP cloaking). "IP addresses" are also referred to herein variously as "IPs" and similarly an "IP address" is also referred to herein variously as an "IP". Examples of IP cloaking comprise, but are not limited to, maintaining a good list of IPs of security vendors and search engines and tracking recently-visited IPs and serve malware to each IP only once.

The system 110 may include an IP randomizer module 160 that is configured to allow the system 110 to route network traffic via multiple geographic locations and leverage an extremely large Internet Protocol address (IP address) pool. The IP randomizer module 160 can also switch IP addresses frequently enough such that the same IP address is not used for an extended (e.g., predetermined) period of time.

In some embodiments, the system 110 comprises a static analysis module 155. The static analysis module 155 may work in tandem with a behavioral analysis module (e.g., a behavior-based analysis that may be also used for forensics analysis and malware detection discussed above). A large volume of malicious samples may be detected daily. Samples that are detected only by the behavioral analysis module may be logged and queued for further analysis (e.g., by an automatic analysis module, by a malware research team, etc.). Static rules (e.g., DSL) may then be developed for these new samples, which permit the static analysis module 155 to also detect them.

The static analysis module 155 may be advantageous for those applications that require a response as quickly as possible. At the same time, static analysis may offer more robust detection against dormant, inactive (many malware servers are active only during specific hours), or broken malware, and also against IP cloaking.

For example, whenever the static analysis module 155 detects a malicious domain that is registered by an attacker, then even if this domain is not currently serving malware (e.g., not currently exhibiting suspicious behavior), the malware detection system may still report a suspicious traceback.

The system 110 can also execute a hybrid analysis that first uses behavioral analysis to execute the malware. During execution, the system 110 may collect forensic evidence (e.g., dynamically generated code and domains involved), and send this data back to the static analysis module 155.

The following descriptions relate to the use of the system 110 for analyzing specific types of targets/suspects.

Referring now to FIG. 2, one type of suspect is a single web page (a URL) or an entire website. In order to describe an example of how an example system 110 scans a URL or website for malware, a summarization of a view of the system 110 is provided.

In this example, a scan job may start from an entry URL, which can be, for example, a root URL 202 of a website. One can expand from the entry URL 202 a graph (see example graph in FIG. 5) by following anchor URLs 204, which are commonly referred to as links. This process of building an anchor URL graph from an entry URL is called crawling.

In the HTTP model, each page, or HTTP resource, is dereferenced by a URL. HTTP resources may be linked to each other by anchor URLs, which are HTML anchors (<a) that link two HTTP resources together. Internally, the system 110 may build such a graph during its scanning processes.

Each individual page often requires multiple resources in order to render properly. These resources are each dereferenced by a URL, and collectively referred to as "render URLs" of a page.

Figure 3:
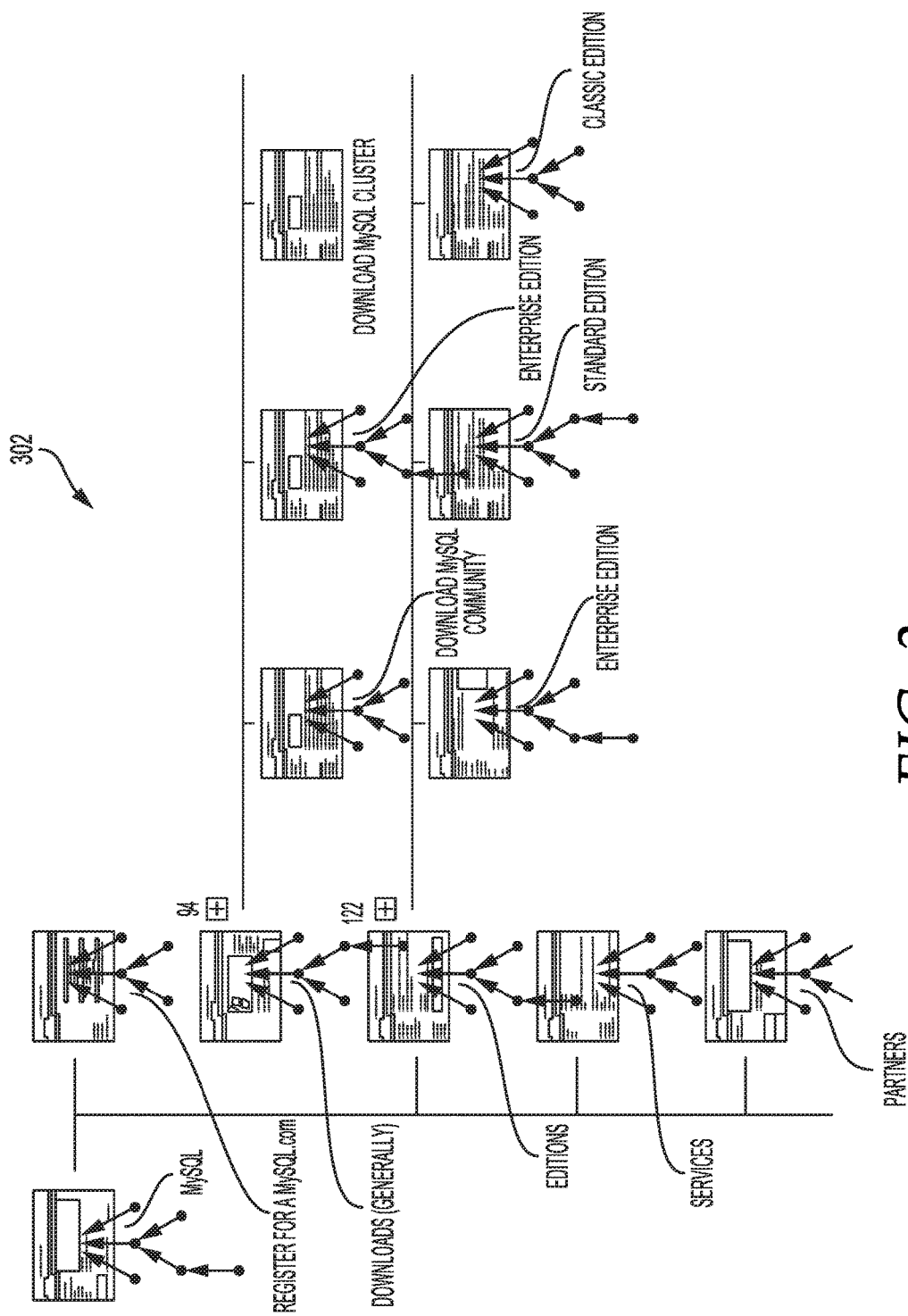
FIG. 3 illustrates an example resource URLs created from www.mysql.com.
Figure 4:
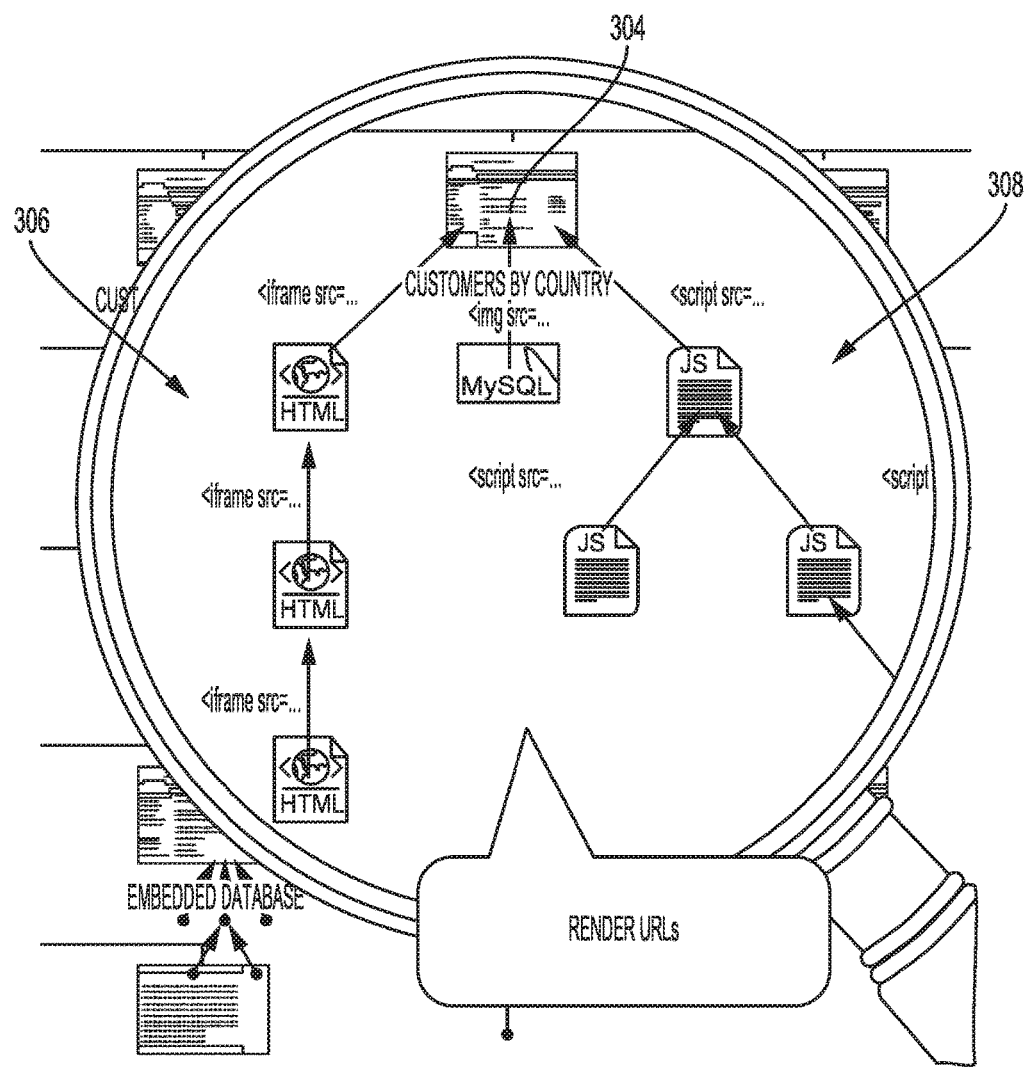
FIG. 4 illustrates a granular view of a resource URL having a plurality of sub-scenes (e.g., events).

FIGS. 3 and 4 collectively illustrate, by way of example of these resources, the render URLs 302 for the website of FIG. 2. The system 110 may also construct similar graphs during its scanning.

When given an entry URL, the system 110 may perform a crawling process and build an anchor-URL graph very similar to that shown in the example in FIG. 5. The anchor-URLs graph may inform the system 110 of a scan scope and a next page to scan. The system 110 may implement a breadth-first search when traversing this graph.

In FIG. 4, a virtualized view of an anchor URL 304 is illustrated. The anchor URL 304 is illustrated with various events or sub-scenes associated therewith. For example, the anchor URL involves customers by country. A plurality of iframe events 306 are utilized for implementing the anchor URL 304. Likewise, a set of Javascripts 308 are executed for the anchor URL 304. Each event is part of the evidence collected for the anchor URL 304.

Pages with URLs that have the same domain name as entry URL may be considered in-scope pages; if otherwise, they may be considered ex-scope pages. The system 110 may only follow in-scope pages when building the anchor-URL graph in some embodiments.

A basic scanning unit used by the system 110 may include a page. When scanning a page, the system 110 may cover all render URLs of that page, irrespective of whether these URLs are in-scope or ex-scope. The same process applies to redirect links.

The following description involves an example analysis. This example is regarding online advertising within an online advertising ecosystem. In the system 110 view of an online ad ecosystem, malvertising may occur when a malicious creative is served through an advertisement tag to a user, such as in their browser application.

Each unique malicious creative may be called a malvertisement. Examples of malvertisements include: click-to downloads; drive-by downloads; phishing; and rogueware or ransomeware—just to name a few.

The system 110 may sample each advertisement tag and scan the creative served. The serving of creatives is often targeted by malware, which means advertising tags may serve different creatives depending on visitor attributes such as IP geolocation, timezone, browser language preferences, and so forth.

To increase sample coverage, users can specify these attributes. For example, a user can instruct the system 110 to scan an advertisement tag from different IP geolocations.

During a malvertising incident, insight may be provided by the system 110 into the malvertising chain. One example chain comprises a malicious advertiser who creates a malicious creative. The malicious creative is served over an advertisement network onto an advertisement exchange in this example. The malicious creative is provided to an optimizer (e.g., system 110) and publisher.

Another example chain comprises a malicious advertiser who creates a malicious creative who places the advertisement for purchase on a demand-side platform. The advertisement can be added to an exchange and published to be made available to visitors. Another example chain comprises a malware attacker who generates a malicious creative that is provided to a compromised advertiser. In this example, the advertiser places the compromised advertisement on a platform and the advertisement is published and accessed by visitors to a website that incorporates or includes the advertisement.

FIG. 5 is an example web UI built using the malware detection system API. The example web UI comprises a graph illustrating temporal events in an advertisement delivery process caused by a user clicking an advertisement tag. For each detected malvertisement, a detailed and precise malvertising chain can be formed using the evidence correlation data contained within the FRM report by the system 110.

In this example, an advertisement tag associated with www.imdb.com 505 is actuated in a behavior sandbox environment. Using the forensic collectors and analyzers, the system traces the advertisement call and service process, determining a specific chain of events that are indicative of malware activity. In this example, a call to showads.pubmatic.com 510 is actuated, which leads to an ad server call to ads.eqads.com 515 and ultimately to a publisher ad.yieldmanager.com 520.

In an exemplary embodiment, to scan document exploits (e.g., document types such as PDFs, Word, Excel, PowerPoint, Flash, and so forth), the user may first host the suspect document file somewhere accessible to the system 110, for example Amazon S3, provided by Amazon™, Inc. The user may then submit a scan job to the system 110, with the target being an HTTPS URL and with access credentials forming a part of the URL.

Upon receiving the scan request, the system 110 may download the document file and then initiate a forensics extraction process, for example, by placing the document in a sandbox. The forensic collectors may determine the document's type by analyzing the document binary content. Both dynamic and hybrid detection modules may be used as mentioned above. At the end of this process, the system 110 may return an FRM-based forensics report in an appropriate file format (e.g., json format, text file, and so forth).

The following examples involve exemplary usage scenarios that would help the user of various embodiments in developing using an API of the present technology.

In one example use case, a user needs to scan a large number of advertisement tags at high sampling rates. The user hopes to reduce traffic and eliminate unneeded data, and obtain only those reports whose results are unclean (e.g., suspicious, malicious, blacklisted content).

In some embodiments, the user may desire to speed up queries and filter out unwanted data. In one embodiment, the system can submit jobs with the response-filter field set to clean. This will cause the system 110 to filter out clean reports when delivering reports to the user. In another example, the system can use a batched report retrieval API to retrieve reports in large batches. Since a response-filter was set to clean for all jobs, the system 110 may return only those reports that are both undelivered and unclean. The user can call this API, for example, every five minutes to retrieve all unclean reports in the last five minutes.

In a sub-scenario, the user would also want to be notified immediately of an unclean report as the unclean report is created. During job submission, a user can set the response-filter field set to clean. At the same time, the user also sets the response-url to a callback URL provided by the user. This may cause the system 110 to post only unclean reports back to the user as the reports are created.

In another example use case, a user wishes to suspend all jobs that are tagged "Optimizer 1." The user can make use of a query-operate API. The user can set the label1 field to Optimizer 1 and the operation field to remove.

In a further example use case, the user desires to permanently remove all jobs in the suspended state. The user can make use of the query-operate API. The user will set the state field to SUSPENDED and the operation field to remove.

In another example use case, the user desires to permanently remove all jobs. The user can make use of the query-operate API. The user will set the operation field to remove. One example implementation is provided below with both a request and response.

In a further example use case, the user desires to suspend all jobs that are tagged "Optimizer 1." The user can make use of the query-operate API. The user will set the operation field to list.

In another example use case, the user desires to update a particular scan job whose ID is 245039. The user can make use of the job removal API. The user can set the scan-request-id field to list.

Advantages of various embodiments of the malware detection system of the present technology include, but are not limited to, being able to use malware signatures against "forensic data" such as bytestreams and events. Various embodiments of the present technology also support chronological event analysis, relational event causality analysis, and creation of multiple decisions per DSL. In some embodiments, the present technology can generating signatures of malware using forensic data (bytestreams and events) detecting malicious code and identifying both campaigns and attackers.

Figure 6:
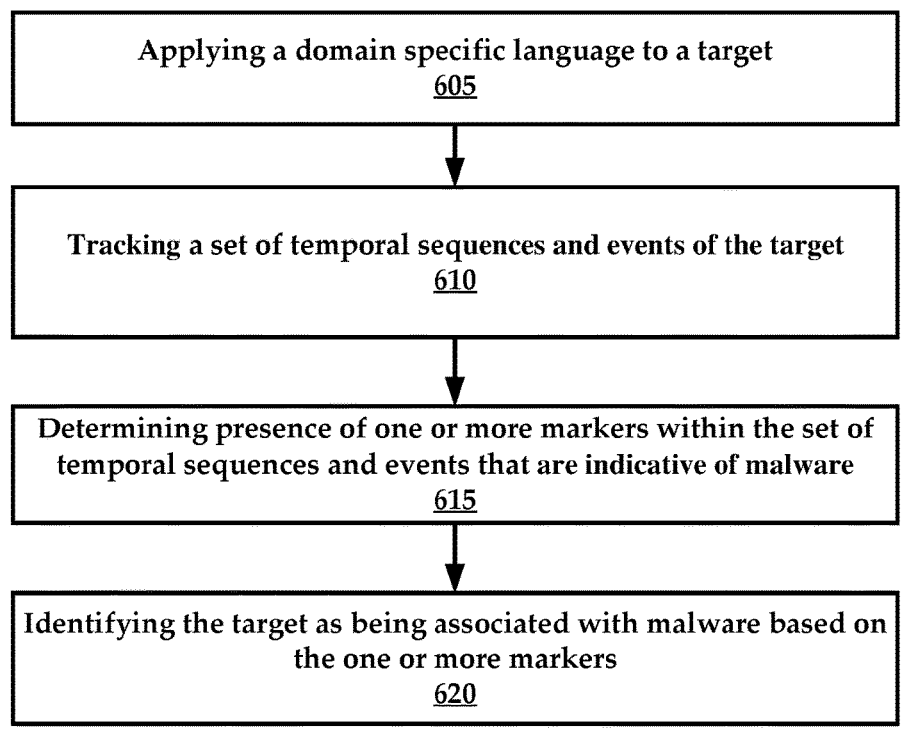
FIG. 6 is a flowchart of an example sandboxing method of the present technology.

FIG. 6 is a flowchart of an example method for behavior profiling of a target to determine malware. In some embodiments, the method includes applying 605 a domain specific language to a target. The domain specific language utilized to detect malware associated with the target and is comprised of rules that are used in the malware detection process.

Next, the method includes observing/tracking 610 a set of temporal sequences and events of the target. This process can be accomplished using a plurality of forensic collector modules.

The method further comprises determining 615 presence of one or more markers within the set of temporal sequences and events that are indicative of malware and identifying 620 the target as being associated with malware based on the one or more markers. Steps 615 and 620 can be accomplished within a behavioral analysis sandbox using a plurality of forensic analyzers.

Figure 7:
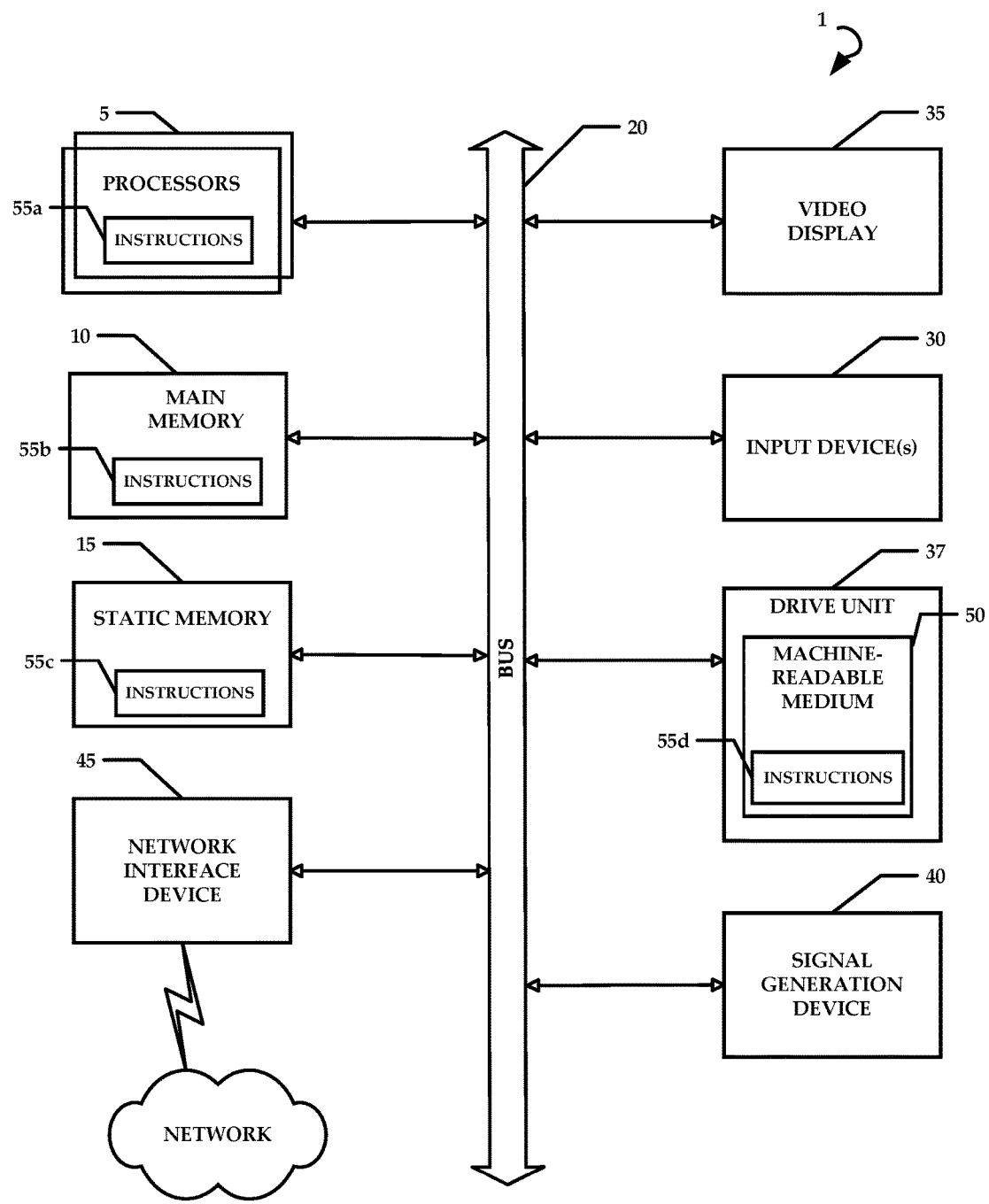
FIG. 7 is a schematic diagram of an example computing system that can be used to practice aspects of the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a disk drive unit 37 (also referred to as disk drive unit or drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55, also identified variously as 55*a*, 55*b*, 55*c*, 55*d* in FIG. 7 for residing, completely or at least partially, in various elements in FIG. 7) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like. Various example embodiments described herein may be implemented in an operating environment comprising software installed on a computer, in hardware, or in a combination of software and hardware.

Not all components of the computer system 1 are required and thus portions of the computer system 1 can be removed if not needed, such as I/O devices.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description herein, for purposes of explanation and not limitation, specific details are set forth, such as particular embodiments, procedures, techniques, etc. In order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the inventions used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for behavior profiling for malware detection, comprising:
    creating, via executable instructions stored in memory and executed by one or more processors coupled to a computer network, a domain specific language for use for detecting searchable patterns and conditions associated with malware,
    the domain specific language, executable by the one or more processors or other processors, being a declarative language definable in response to a user specification;
    providing, in response to executing the domain specific language, a set of rules for use for the detecting of the searchable patterns associated with the malware, the set of rules provided by the domain specific language; and
    detecting, by the set of rules, a set of temporal sequences and temporal events of a domain for the malware detection, the domain comprising a target associated with the computer network.

2. The method of claim 1, wherein the target comprises any of an HTTP conversation, a URL, a starting URL, an advertisement tag, a document file, an executable file, and combinations thereof.

3. The method of claim 1, wherein the domain specific language is a threat description language configured for deployment as part of hardware on a network, a server, or the target.

4. The method of claim 3, wherein the target is an Internet web server and the domain specific language is configurable for describing behavior and the patterns exhibited within conversations between HTTP clients.

5. The method of claim 1, wherein the domain specific language is configured for deployment as a cloud-based software-as-a-service (SaaS).

6. The method of claim 1, wherein the user specification includes tests to be performed while analyzing an HTTP conversation, wherein the domain specific language does not specify how the user-specified tests are run, the order of execution or logic flow for the user-specified tests.

7. The method of claim 1, further comprising:
    applying, via the executable instructions stored in the memory and executed by the one or more processors or the other processors, the domain specific language to the target accessible via the computer network, the domain specific language for detecting the malware associated with the target, the set of rules for the domain specific language further including, in addition to the detecting of the set of temporal sequences and temporal events of the target,
    determining a presence of a particular one of the patterns within the set of temporal sequences and temporal events, that is indicative of the malware; and
    identifying the target as being associated with the malware based on the presence of the particular one of the patterns.

8. The method of claim 7, wherein the particular one of the patterns comprises one or more markers.

9. The method of claim 7, further comprising, utilizing the domain specific language, and creating a behavior profile for the target based on the set of temporal sequences and temporal events.

10. The method of claim 7, further comprising, in response to identifying the target as being associated with the malware, determining behavioral knowledge of the target that is associated with the malware.

11. The method of claim 7, further comprising:
    determining if the malware is configured to protect itself from a monitored lab environment;
    in response to the determining, the malware is configured to protect itself from the monitored lab environment, provoking the malware to attack; and
    in response to the provoking, recording activities of the malware, wherein each of the activities comprises a time stamp such that the activities can be arranged in a chronological order.

12. The method of claim 11, further comprising, using the domain specific language, creating a behavioral sandbox environment where the target is inspected for malware, the behavioral sandbox environment comprising a plurality of forensic collectors configured to gather evidence from the malware.

13. A malware detection system, comprising:
a processor; and
a memory for storing executable instructions, the instructions being executed by the processor to perform a method, the method comprising:
creating, via executable instructions stored in the memory and executed by the processor, a domain specific language for use for detecting searchable patterns and conditions associated with malware,
the domain specific language being a declarative language definable in response to a user specification;
providing, via the domain specific language, a set of rules for use for the detecting of the searchable patterns associated with the malware, the set of rules generated from the domain specific language; and
detecting, by the set of rules, a set of temporal sequences and temporal events of a domain, the domain comprising a target associated with the computer network.

14. The system of claim 13, wherein the target comprises any of an HTTP conversation, a URL, a starting URL, an advertisement tag, a document file, an executable file, and combinations thereof.

15. The system of claim 13, wherein the domain specific language is configured for deployment as part of hardware on a network, a server, or the target, or is configured for deployment as a cloud-based software-as-a-service (SaaS).

16. The system of claim 13, wherein the method further comprises:
applying, via the executable instructions stored in the memory and executed by the processor or other processors, the domain specific language to a the target accessible via the computer network, the domain specific language for detecting the malware associated with the target, the set of rules for the domain specific language further including, in addition to the detecting of the set of temporal sequences and temporal events of the target:
determining a presence of a particular one of the patterns having one or more markers within the set of temporal sequences and temporal events that are indicative of the malware; and
identifying the target as being associated with the malware based on the presence of the particular one of the pattern having the one or more markers.

17. The system of claim 16, further comprising, utilizing the domain specific language, and creating a behavior profile for the target based on the set of temporal sequences and temporal events.

18. The system of claim 16, further comprising, using the domain specific language, and creating a behavioral sandbox environment where the target is inspected for malware, the behavioral sandbox environment comprising a plurality of forensic collectors.

19. The system of claim 18, wherein each of the plurality of forensic collectors is configured to:
allow the target to execute therein;
collect evidence from the malware using a plurality of collector modules, wherein the evidence comprises activities of the malware;
determine malicious behavior from the set of temporal sequences and temporal events; and
log the target in response to the malicious behavior being determined or suspected.

20. A method for behavior profiling for malware detection, comprising:
applying, via executable instructions stored in memory and executed by one or more processors coupled to a computer network, a domain specific language to a target accessible via the computer network,
the domain specific language being definable in response to a user specification for detecting malware associated with the target; and
providing a set of rules generated from the domain specific language including:
detecting a set of temporal sequences and temporal events of the target,
determining a presence of a particular pattern within the set of temporal sequences and temporal events, that is indicative of the malware, and
identifying the target as being associated with the malware based on the presence of the particular pattern.

* * * * *